(12) United States Patent
Chiang

(10) Patent No.: US 7,406,208 B2
(45) Date of Patent: Jul. 29, 2008

(54) EDGE ENHANCEMENT PROCESS AND SYSTEM

(75) Inventor: Patricia Wei Yin Chiang, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 706 days.

(21) Appl. No.: 10/847,206

(22) Filed: May 17, 2004

(65) Prior Publication Data

US 2005/0008251 A1 Jan. 13, 2005

(30) Foreign Application Priority Data

May 17, 2003 (SG) .............................. 200303013-7

(51) Int. Cl.
 *G06K 9/40* (2006.01)
 *G06K 9/48* (2006.01)
(52) U.S. Cl. ...................... 382/266; 382/199; 382/260; 382/269
(58) Field of Classification Search ................ 382/266, 382/269; 358/462, 466
 See application file for complete search history.

(56) References Cited

U.S. PATENT DOCUMENTS

| | | | | |
|---|---|---|---|---|
| 5,351,305 | A * | 9/1994 | Wood et al. ................. | 382/128 |
| 5,920,356 | A * | 7/1999 | Gupta et al. ................ | 348/606 |
| 5,960,102 | A * | 9/1999 | Van Eeuwijk et al. ....... | 382/128 |
| 6,094,205 | A | 7/2000 | Jaspers | |
| 6,278,492 | B1 * | 8/2001 | Nakamura ................... | 348/441 |
| 6,628,330 | B1 * | 9/2003 | Lin ............................. | 348/252 |
| 6,690,375 | B2 * | 2/2004 | Ogawa et al. ............... | 345/443 |
| 6,741,727 | B1 * | 5/2004 | Hirasawa ................... | 382/112 |
| 6,774,943 | B1 * | 8/2004 | Kao et al. ................... | 348/252 |
| 6,947,057 | B2 * | 9/2005 | Nelson et al. .............. | 345/611 |
| 7,155,067 | B2 | 12/2006 | Jayant et al. | |

FOREIGN PATENT DOCUMENTS

WO 01/52188 A2 7/2001
WO 01/67392 A2 9/2001

* cited by examiner

*Primary Examiner*—Jingge Wu
*Assistant Examiner*—Jose M Torres
(74) *Attorney, Agent, or Firm*—Lisa K. Jorgenson; Robert Iannucci; Seed IP Law Group PLLC

(57) ABSTRACT

An edge enhancement system, including a selective edge controller for determining one or more properties of an edge of image data, and for generating one or more weighting factors on the basis of properties of the edge; and a scaling module for scaling an edge enhancement signal by the weighting factors to control the degree of edge enhancement. The image data may represent a still or moving (i.e., video) image. A max-min search circuit determines maximum and minimum turning points closest to the center of the data processing window and that are located on opposing sides of the window, to determine values and locations of maximum and minimum pixels of the edge. An edge-directed pre-filtering circuit reduces the amplification of edge fuzziness by smoothing close the edges vertical prior to enhancement. An aliasing protection circuit reduces the visibility of saw-tooth defects on predominantly horizontal diagonal edges.

45 Claims, 9 Drawing Sheets

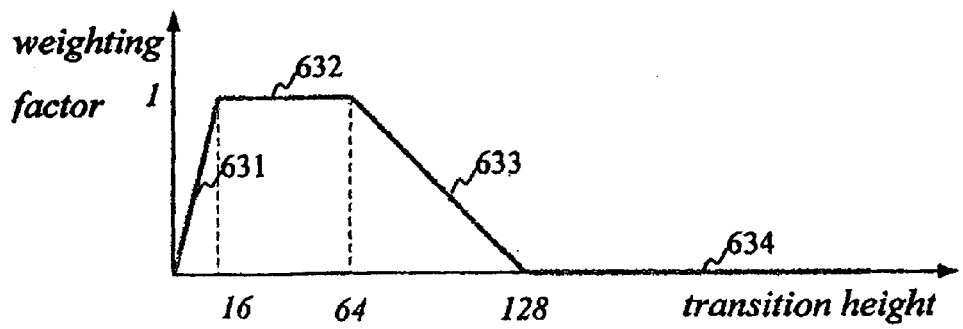
FIG. 6D
| T1 | T2 | T3 | T4 | T5 | T6 | T7 | T8 | T9 |
|----|----|----|----|----|----|----|----|----|
|    |    |    | P4 | P0 | P5 |    |    |    |
| B1 | B2 | B3 | B4 | B5 | B6 | B7 | B8 | B9 |
FIG. 7A
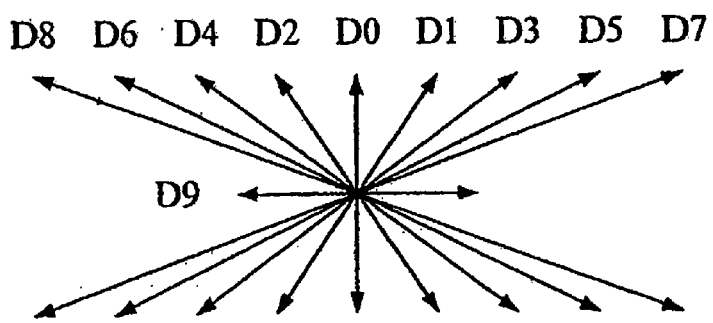
FIG. 7B

EDGE ENHANCEMENT PROCESS AND SYSTEM

BACKGROUND OF THE INVENTION

1. Field of the Invention

The present invention relates to an edge enhancement process and system for image data representing static or moving (i.e., video) images.

2. Description of the Related Art

Luminance transient improvement or enhancement refers to the sharpening of an image by steepening edge transitions on the luminance component of the image, thereby increasing the original signal bandwidth. There are two general approaches to making an edge steeper. One approach increases pixel values on the high side of an edge and decreases pixel values on the other side of the edge, thereby making a gradual transition more abrupt. The other approach is to replace pixel values near the edge with pixel values further away from the edge.

In general, existing transient improvement circuits are based on one of three transient improvement techniques. The first technique uses edge detectors. Usually, the center of the edge is located and the degree of enhancement applied to a given pixel depends upon the distance away from the center of the edge and also on the magnitude of the edge. International Patent Application Publication No. WO 01/67392, entitled *System and Method for Improving the Sharpness of a Video Image*, and incorporated herein by reference in its entirety, describes an edge sharpening system including a sub-pixel edge center locator that reduces visible jitter after enhancement. The system also provides gain control for the enhancement signal using the relative position of edge information to tackle the "over-the-hill" problem that occurs for an edge when pixels of a second edge are shifted.

The second technique employs a strong peaking filter. Although peaking filters do not increase frequency components, they steepen the edges. By clipping the overshoot and undershoots, high frequency components are introduced to increase the original signal bandwidth and sharpen the image at the same time. In addition, special boundary conditions are detected at the pixel level whereby adjustments are constrained.

The third technique extracts the maximum and minimum values of a local window. U.S. Pat. No. 6,094,205, entitled *Sharpness Control,* and incorporated herein by reference in its entirety, performs edge enhancement using the $2^{nd}$ derivative to select the minimum or maximum pixel value and then generates a fading transition between the original and the selected minimum/maximum pixel value using the magnitude of the first derivative.

International Patent Application Publication No. WO 01/52188, entitled *Method and Apparatus for Edge Detection,* and incorporated herein by reference in its entirety, discloses a method for edge detection using a low pass second derivative for increased robustness in noise and aliasing, a thresholded first derivative to distinguish between noise and edges, and a third to first derivative comparison as an edge frequency calculation to differentiate soft and hard edges for suitable edge enhancement.

There are a number of difficulties with existing edge enhancement processes. The first has been attributed to discrete time sampling in that an edge center may not coincide with the pixel grid. If the resulting error in the exact location of the edge becomes too large, jitter becomes visible after enhancement. Generally, this problem only occurs when edge enhancement is based on the distance from the edge center that is identified by the pixel grid.

A second problem is the over-enhancement of soft and hard edges that results in an artificial-looking image. An example of soft edges is the enhancement of facial features. The 3D information of the visualized object, represented on the 2D plane, is lost as the smooth edges are straightened and steepened. In addition, visible contouring of images is introduced after edge steepening because the subset of pixel representation for the edge has been reduced significantly. Furthermore, when hard edges are steepened further, unnatural looking plateaus on both sides of the edge are generated.

Thirdly, edge processing methods are generally not robust to noise and often result in images with enhanced noise. In methods based on detected edge centers, local processing masks used with $2^{nd}$ derivative operators or Laplace operators locate edges most precisely, but are very sensitive to noise. Stochastic gradient operators, on the other hand, are most robust to noise, but are not easy to implement as the level of noise changes. Similarly, methods using peaking filters are very sensitive to noise. The conventional counteraction strategy is to use low pass filters or derivatives, as described in International Patent Application Publication No. WO 01/52188.

A fourth problem is the inflexibility to handle close and complicated edges. Generally in pixel level processing, special boundary conditions are made to cater for such situations but these may not be sufficient to cover all cases. A typical artifact is the result of shifting pixels of another edge and thus changing the contents of the image. As described in International Patent Application Publication No. WO 01/67392, this "over-the-hill" problem can be alleviated by controlling the gain of the enhancement signal based on the distance between the detected edge pixels.

Another problem is the enhancement of fuzzy edges, resulting in obvious jagged edges. Fuzzy edges often occur on a soft focused background and/or image. They may be present due to randomness introduced on edges for special effects purposes or the deteriorating quality of old films.

Finally, edge enhancement brings about an aliasing side effect in the vertical direction that manifests itself in the form of saw-tooth edge. The horizontal steepening of a diagonal edge draws pixel values further from the edge nearer to the center. As the edge slopes away from the vertical, the further spaced apart the center of the 1D edge relative to its counterpart above and below the line, the more obvious the saw tooth pattern becomes to the observer. This effect worsens and appears as horizontal flickering lines when the image is interlaced and the edge is moving.

It is desired therefore, to provide an edge enhancement system and process that alleviate one or more of the above difficulties, or at least to provide a useful alternative.

BRIEF SUMMARY OF THE INVENTION

In accordance with one embodiment of the present invention, there is provided an edge enhancement process, including:

determining one or more properties of an edge of image data;

generating one or more weighting factors on the basis of said one or more properties of said edge; and scaling an edge enhancement signal by said one or more weighting factors to control the degree of edge enhancement.

Preferably, the edge enhancement process includes:

identifying maximum and minimum turning points from said image data; and selecting, from the identified maximum and minimum turning points, a maximum turning point and a minimum turning point that are located on opposing sides of, and closest to, a center location of said image data to provide values and locations of maximum and minimum pixels of said edge.

Preferably, the edge enhancement process includes:

generating first derivative values from said image data;

identifying, on the basis of said first derivative values, turning points that meet at least one predetermined noise criterion; and wherein said maximum and minimum turning points are selected from the identified turning points.

Another embodiment of the present invention provides an edge enhancement system, including a selective edge controller for determining one or more properties of an edge of image data, and for generating one or more weighting factors on the basis of said one or more properties of said edge; and a scaling component for scaling an edge enhancement signal by said one or more weighting factors to control the degree of edge enhancement.

Preferably, the edge enhancement system includes an edge detector for determining a maximum turning point and a minimum turning point that are closest to a center location of said image data and that are located on opposing sides of said center location, to determine values and locations of maximum and minimum pixels of said edge.

Preferred embodiments of the present invention, described hereinafter, rather than using edge detector based approach, can identify the maximum and minimum points within a local processing window with a max-min search component. However, unlike the process in described U.S. Pat. No. 6,094,205, only the maximum and minimum points closest to the pixel of interest in the local processing window are considered. The local maximum and minimum pixel values and their respective positions can be used to locate an edge center with sub-pixel precision, effectively resolving the jitter problem.

With sufficient edge information, edge enhancement is performed without compromising picture quality with selective edge control. By applying adaptive levels of enhancement for different edges, over-enhancement of edges is controlled. Soft edges add depth perceptibility to the picture and are not suitable for steepening while hard edges are already steep enough to demand further enhancement. Thus a relatively lower magnitude of enhancement is applied to such edges while normal strength is maintained for other edges at the same time.

Generally, edges can be classified into soft, hard, semi-soft and semi-hard edges by considering simple edge properties such as transition width, transition height and transition slope. With constraints on enhancement based on these edge properties, mid-strength edges such as semi-soft and semi-hard edges are emphasized, whereas extreme soft and hard edges are de-emphasized, thus reducing the occurrence of over-enhancement artifacts and providing an enhanced image.

To provide noise-robust edge improvement, the max-min search component considers the maximum and minimum points qualitatively from both the temporal and magnitude aspects of the video signal. The former refers to the period of sustainability in the change of video signal. A short-lived increase or decrease in magnitude is highly likely to be the result of noise and is therefore not usually considered to be a maximum or a minimum point. The magnitude aspect refers to the magnitude of the change in the video signal, and further differentiates between actual picture details and noise in short-lived transitions. Short-lived transitions lower than a user-defined threshold are considered as noise disturbances and are not enhanced, thereby increasing the noise robustness of edge enhancement.

The max-min search component selects the two turning points nearest to the center of the processing window, one maximum and the other minimum, and that form a region encompassing the center pixel. This region contains the edge to which the center pixel belongs, and enhancement is then performed on this edge. The advantages are that close edges are handled in a generic way and "over-the-hill" problems are avoided.

To reduce the visibility of jagged edges after enhancement, an edge-directed filtering operation is performed prior to enhancement. This filtering smoothes fuzzy edges by averaging pixel values along selected edge directions and this affects the subsequently generated enhancement difference signal. An edge direction detector is used to detect the direction of edges, and directions close to the vertical are then subjected to pre-enhancement filtering because jagged edges are more noticeable in near-vertical edges.

On the other hand, edges closer to the horizontal exhibit undesirable aliasing effects especially after enhancement due to the expansion of the vertical frequency range above a subjectively acceptable level. Rather than applying post-processing such as vertical filtering on the enhanced signal, the enhancement on these edges is reduced according to the amount of vertical aliasing present, thus providing aliasing protection.

BRIEF DESCRIPTION OF THE SEVERAL VIEWS OF THE DRAWINGS

Preferred embodiments of the present invention are hereinafter described, by way of example only, with reference to the accompanying drawings, wherein:

FIG. 6D is a schematic diagram illustrating the relationship between a transition height weighting factor and the transition height of an edge, used in a vertical selective edge control circuit of the transient improvement circuit;

FIG. 7A is a schematic diagram illustrating a processing window used in an edge direction detector of the transient improvement circuit;

FIG. 7B is a schematic diagram illustrating a set of edge directions corresponding to the processing window shown in FIG. 6A;

DETAILED DESCRIPTION OF THE INVENTION

Figure 1:
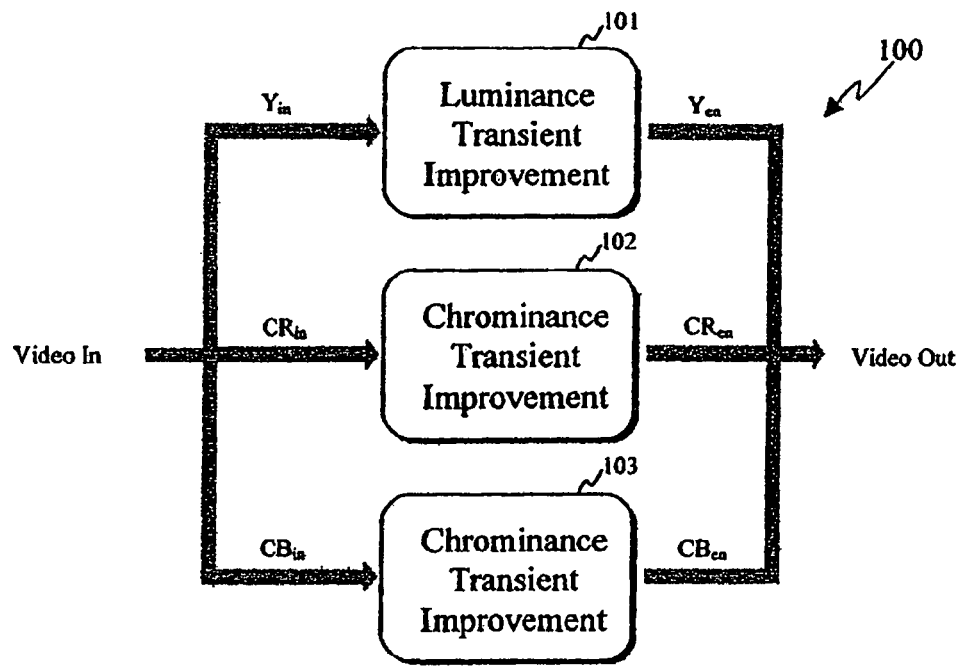
FIG. 1 is a block diagram of a preferred embodiment of an edge enhancement system.

As shown in FIG. 1, an edge enhancement system 100 includes a luminance transient improvement circuit 101 and two chrominance transient improvement circuits 102, 103 for respective chrominance components. The edge enhancement system 100 executes an edge enhancement process to generate output image data with enhanced edge features from input image data. In the preferred embodiment, the edge enhancement process is implemented by hardware components of the edge enhancement system 100, including application-specific integrated circuits (ASICs). However, it will be apparent to those skilled in that art that at least parts of the edge enhancement process can alternatively be provided by one or more software modules executed by a digital signal processor (DSP) or other computing device, such as a standard computer system.

Figure 11:
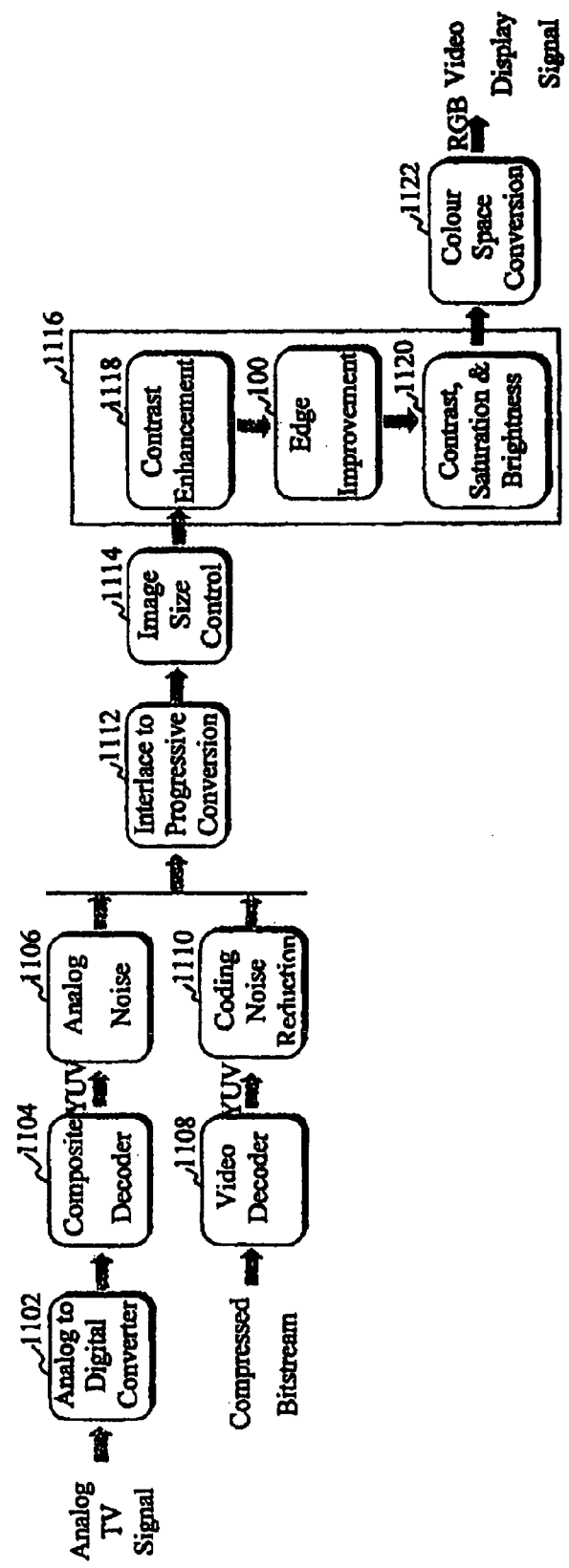
FIG. 11 is a block diagram of a preferred embodiment of a television display processor incorporating the edge enhancement system.

The edge enhancement system 100 can be used as a component in a variety of still and moving (i.e., video) image devices and systems. For example, the edge enhancement system 100 can be used to enhance the subjective quality of video playback in a digital video player device or software application. In the described embodiment, the edge enhancement system 100 is a component of an analog and/or digital television (TV) display processor, as shown in FIG. 11. Analog TV signals received from broadcast are first converted to digital composite signals in an Analog to Digital Converter block 1102. The composite signals are then decoded to component YUV signals in a Composite Decoder Block 1104. These components are processed by an Analog Noise Reduction Block 1106 to remove any undesired Gaussian and impulse noise that may be introduced during various transmission and conversion processes, using temporal and spatial noise filters.

Digital TV signals in the form of compressed MPEG bitstreams are decoded into component YUV signals by an MPEG Video Decoder Block 1108. The uncompressed video signals are then processed by a Coding Noise Reduction Block 1110 to eliminate artifacts resulting from encoding processes using de-blocking and de-ringing filters.

The digital and analog TV signals are processed to generate suitable output signals for the display which can be a cathode ray tube (CRT) display or a liquid crystal display, as follows. The noise free signals are converted to progressive signals in an Interlace to Progressive Conversion Block 1112 and then scaled, cropped and zoomed to an appropriate size and format for display in an Image Size Control Block 1114. Before being displayed, the signals are enhanced by an image enhancement block 1116 to improve the subjective image quality.

The image enhancement block 1116 includes a Contrast Enhancement Block 1118 that increases the picture contrast subjectively, the edge enhancement system 100 that improves the picture edge details, as described in detail below, and a Contrast, Saturation & Brightness Block 1120 that adjusts the dynamic range and saturation of the image according to user preferences. The enhanced signals are finally converted to an appropriate color format such as an RGB signal for a CRT display using a Color Space Conversion Block 1122.

Figure 2:
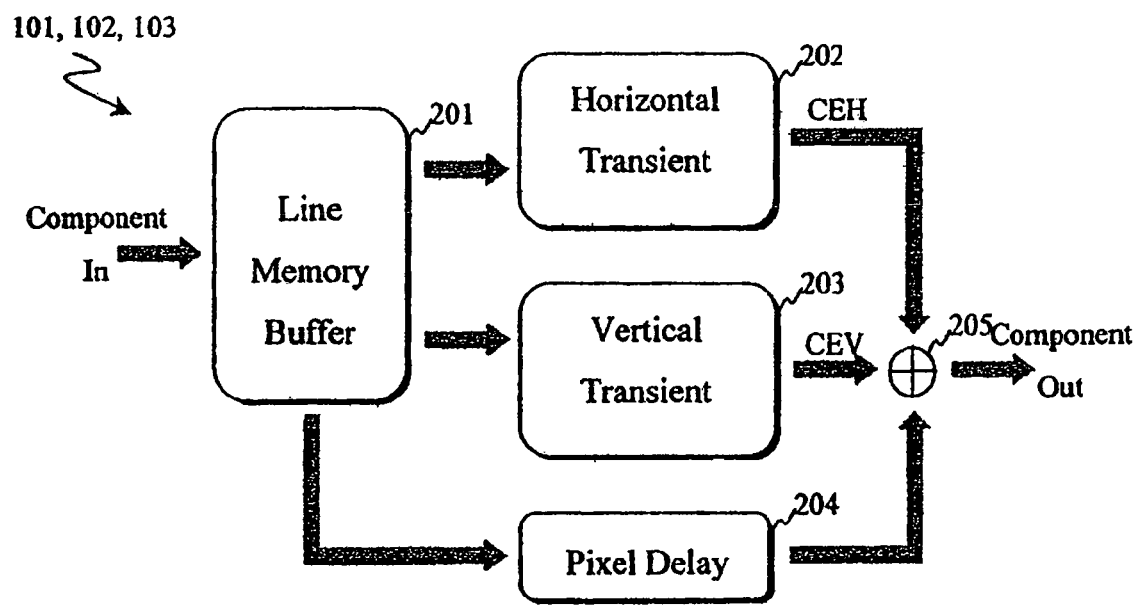
FIG. 2 is a block diagram of a transient improvement circuit of the edge enhancement system.

Returning to FIG. 1, the video data input to the luminance transient improvement circuit 101 is the luminance video component Y from interlaced or progressive video with field data flow, zoomed video or contrasted. The inputs to the chrominance transient improvement circuits 102 and 103 are respectively chrominance red Cr and chrominance blue Cb video components which can be provided from parallel video sources to the luminance transient improvement circuit 101 with a chrominance sampling format of 4:4:4 or 4:2:2; i.e., where there is one chrominance sample for every luminance sample or every two luminance samples in a video line. The transient improvement circuits 101, 102, 103 generate enhance luminance and chrominance video signals. As shown in FIG. 2, the transient improvement circuits 101,102, 103 include a line memory buffer 201, a horizontal transient improvement circuit 202, a vertical transient improvement circuit 203, a pixel delay circuit 204, and an adder circuit 205. The input video component (i.e., the luminance component Y, chrominance red component Cr, or chrominance blue component Cb, depending upon which of the three transient improvement circuits 101, 102, 103 is being considered), is stored in the line memory buffer 201 which has sufficient storage capacity for multiple lines of component video data. The component video is processed and stored in raster-scan order; i.e., moving from the top left pixel horizontally towards the right, and repeating the same order for subsequent lines until the bottom right pixel.

Several lines of stored component video are fed simultaneously to the horizontal transient improvement circuit 202 that processes edge enhancement horizontally to generate a horizontal enhancement difference signal CEH, and the vertical transient improvement circuit 203 that processes edge enhancement vertically to generate a vertical enhancement difference signal CEV. The current component video line of interest is delayed by the pixel delay circuit 204 to synchronize the component video with the output enhancement difference signals from the transient improvement circuits 202 and 203, all of which are then combined together using the adder circuit 205 for minimum delay purposes to generate the enhanced output component video. It will be apparent that the combination of the output enhancement difference signals and the component video line is not limited to parallel addition and in particular can alternatively be serial combination for providing one dimensional transient improvement.

For convenience, the edge enhancement process and the horizontal and vertical transient improvement circuits 202, 203 are described below in relation to the luminance component of video; i.e., relating specifically to the luminance transient improvement circuit 101. However, it will be apparent that the description below also applies to the chrominance video components and transient improvement circuits 102, 103.

Figure 3:
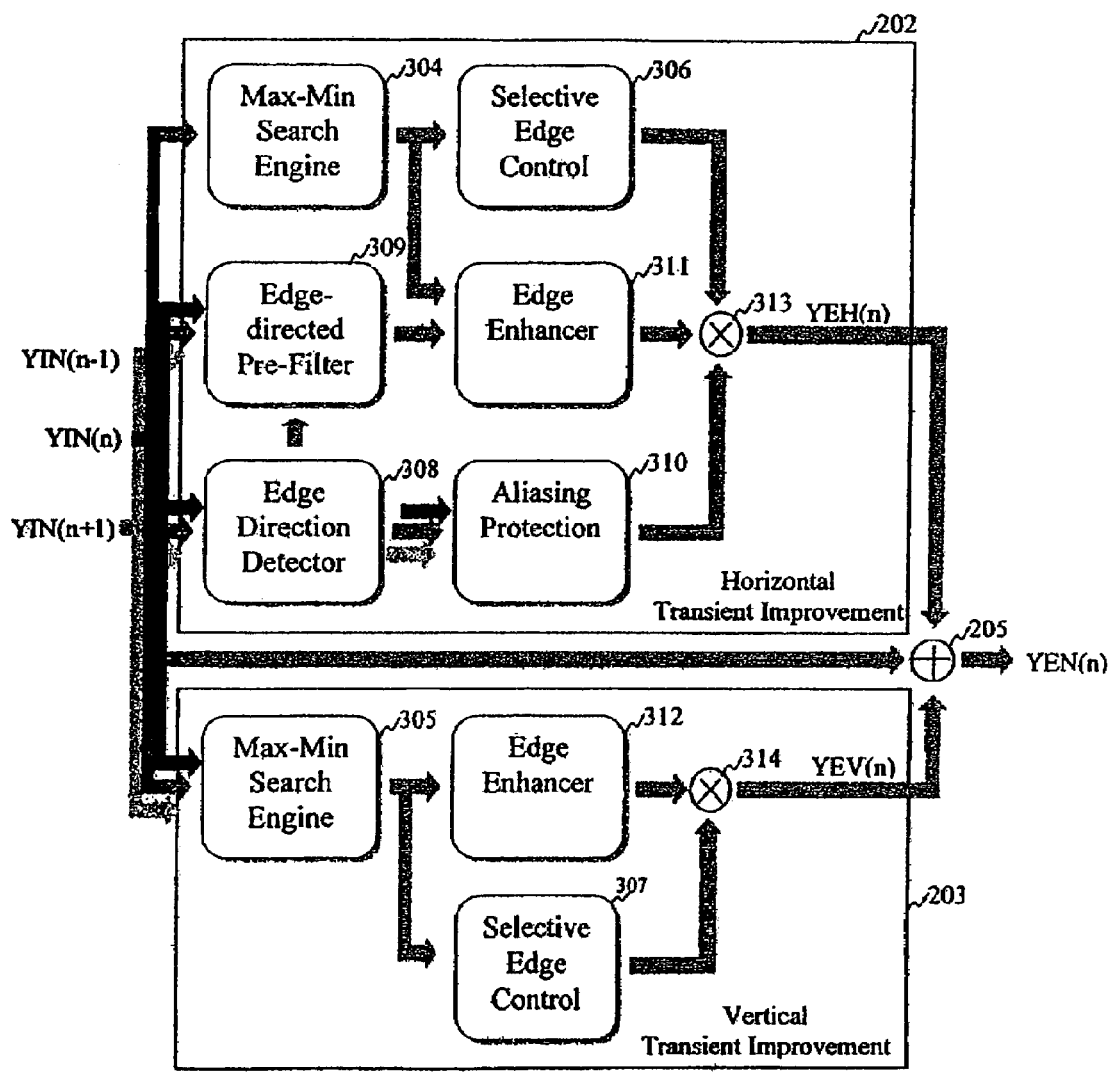
FIG. 3 is a block diagram of the components of the transient improvement circuit, omitting the line memory buffer.

As shown in FIG. 3, the horizontal and vertical transient improvement circuits 202, 203 include max-min search circuits 304, 305, selective edge control circuits 306, 307, edge enhancement circuits 311, 312, and multiplier circuits 313, 314. The horizontal transient improvement circuit 202 also includes an edge direction detector circuit 308, an edge-directed pre-filtering circuit 309, and an aliasing protection circuit 310.

The horizontal transient improvement circuit 202 and the vertical transient improvement circuit 302 process three luminance video line inputs, represented by video lines YIN(n), YIN(n−1) and YIN(n+1) where n refers to the current video line. The enhancement difference outputs YEH(n) and YEV(n) from the two circuits are combined with the current video line luminance data YIN(n) to generate YEN(n). Although the edge enhancement system 100 is described as processing input video data in groups of three video lines, alternative embodiments can be provided in which the horizontal transient improvement circuit 202 processes any odd number $\geq 1$ of video lines and the vertical transient improvement circuit 302 processes any odd number $\geq 3$ of video lines, at the expense of additional buffer memory and processing overheads.

The horizontal and vertical transient improvement circuits 202, 203 process video component data sequentially in respective one-dimensional processing windows, where the pixel at the center of a processing window is referred to as the center or current pixel YIN within the current video line YIN(n). The horizontal and vertical max-min search circuits 304, 305 respectively locate any horizontal and vertical edges to which the current pixel belongs. An edge is represented by a maximum and a minimum pixel values closest to and on opposite sides of the center pixel within the corresponding one-dimensional processing window, and the locations of those pixels, where the derivatives with respect to the corresponding dimension at those locations are zero, as described below.

The selective edge control circuits 306 and 307 constrain the degree of enhancement by applying weights to enhancement outputs on the basis of the edge information generated by the horizontal and vertical max-min search circuits 304, 305. The edge direction detector 308 determines the direction of the edge that the current pixel resides on, and the edge-directed pre-filtering circuit 309 performs low pass filtering along the detected edge direction. The aliasing protection circuit 310 reduces vertical aliasing for selected diagonal edges, and the edge enhancer circuits 311, 312 determine the enhancement either by the magnitude of input from the edge-directed pre-filtering circuit 309 relative to the edge magnitude, and/or by the position of the center pixel relative to the edge positions with the outputs scaled by selective edge control weighting factors and/or aliasing protection weighting factors. The scaling is performed by the multiplier circuit 313. The enhanced luminance pixel difference data YEH and YEV are then added to the current pixel luminance data YIN by the adder circuit 205. From a spatial point of view, the local processing windows used in the horizontal transient improvement circuit 202 and the vertical transient improvement circuit 302 are then moved along the video component line data by one pixel in the horizontal direction to select the next pixel within the current video line YIN(n) as the new current pixel component data YIN. When the end of the current video component line is reached, the local processing windows are moved to the leftmost pixel of the next video line; i.e., n=n+1.

Figure 9:
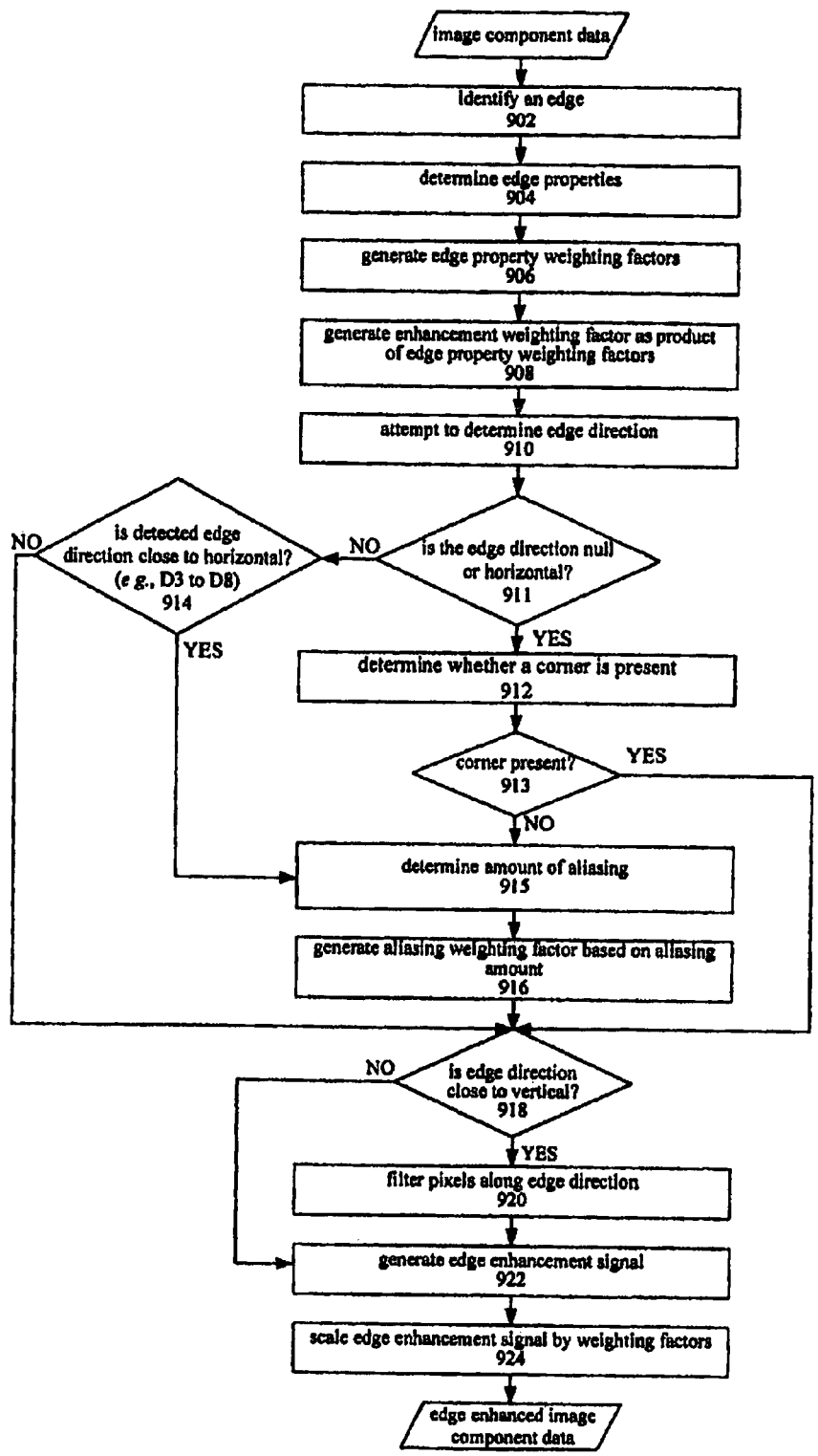
FIG. 9 is a flow diagram of a horizontal edge enhancement process executed by the edge enhancement system.

It will be apparent from the description above that the vertical transient improvement circuit 203 provides only a subset of the functionality of the horizontal transient improvement circuit 202. Accordingly, the generation of output image data with enhanced edge features from input video component data within the current local processing window is described below in more detail with reference to a horizontal edge enhancement process, as shown in FIG. 9, executed by the horizontal transient improvement circuit 202.

The steps of the horizontal edge enhancement process can be applied to the vertical direction as a vertical edge enhancement process by omitting steps 910 to 920 related to the edge direction detector 308, the pre-filtering circuit 309 and the aliasing protection circuit 310. In particular, when three video component lines are used as input to both transient improvement circuits 202, 203, the components 305, 307, 312 of the vertical transient improvement circuit 203 provide analogous functionality to the corresponding components 304, 306, 311 of the horizontal transient improvement circuit 202. Differences between the two transient improvement circuits 202, 203 are described below where necessary.

The horizontal edge enhancement process begins when the horizontal max-min search circuit 304 uses an edge identification process 902 to identify an edge that the center pixels is part of. An edge is identified by searching for maximum and minimum pixel values with zero first derivatives for the edge to which the center pixel belongs. Only the maximum and minimum points closest to and on opposite sides of the center pixel within the local processing window are selected. The local maximum and minimum pixel values and their respective positions can be used to locate an edge center of sub-pixel precision, reducing jitter. The horizontal max-min search circuit 304 also filters out the influence of disturbances or noise present in the component image data that might otherwise be amplified by enhancement.

The horizontal max-min search engine 304 uses a local processing window with dimensions of 9×1 pixels. However, it will be apparent that the window dimensions can be varied as desired and that a large window size can encompass large edges with low frequencies fully, whereas a smaller window size can encompass smaller edges fully but may only encompass larger edges in two or more portions spread over a number of pixels in a consecutive series of overlapping windows.

Figure 4:
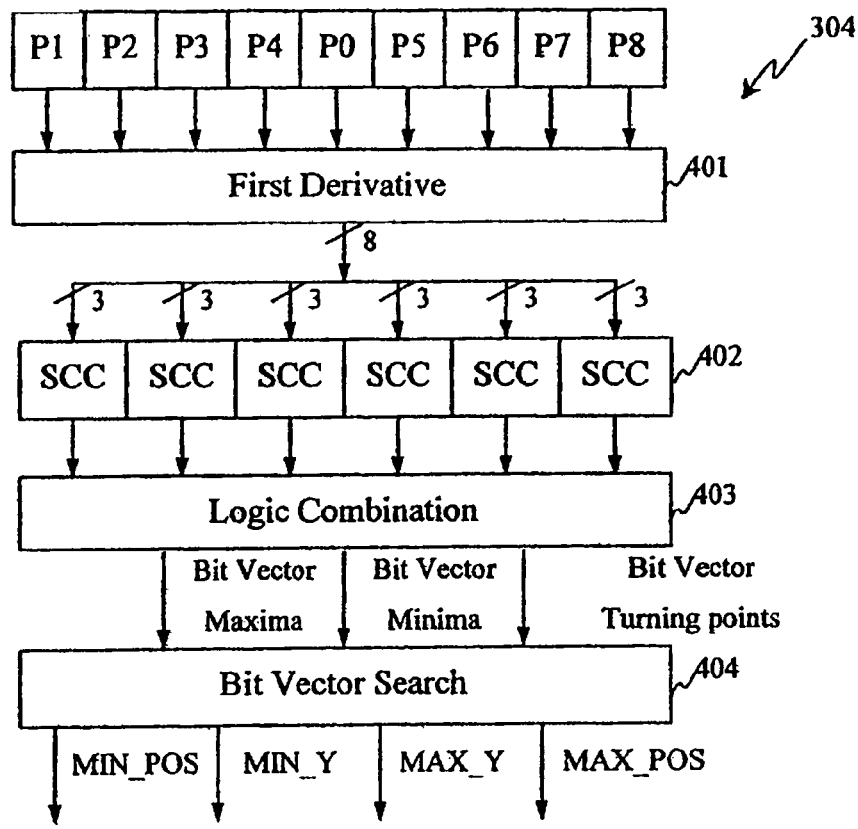
FIG. 4 is a block diagram of a horizontal max-min search engine of the transient improvement circuit.
Figure 10:
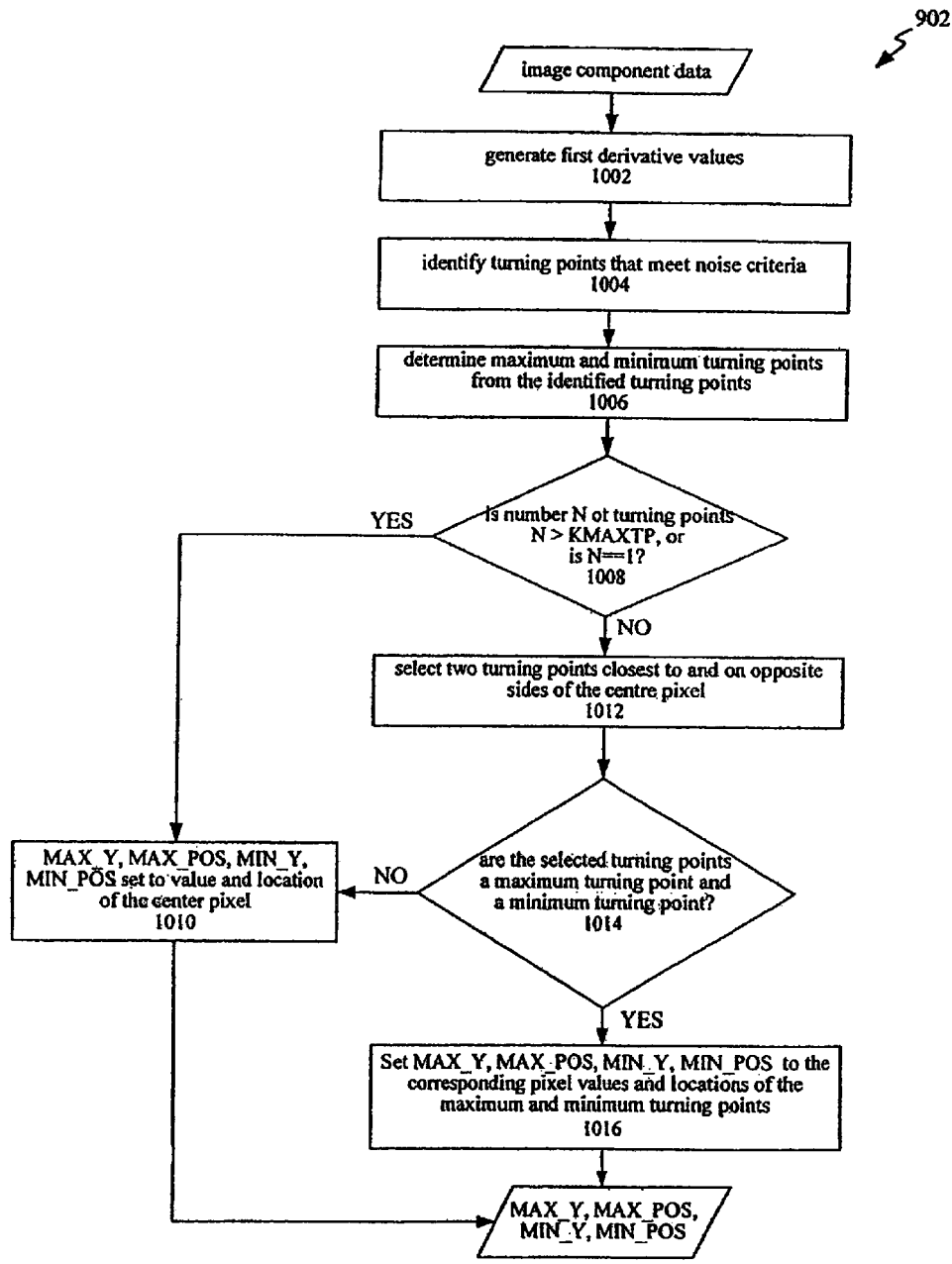
FIG. 10 is a flow diagram of an edge identification process of the horizontal edge enhancement process.

As shown in FIG. 4, the horizontal max-min search circuit 304 includes a derivative circuit 401, six sign comparison circuits 402, a logic combination circuit 403, and a bit-vector search circuit 404. As shown in FIG. 10, the edge identification process 902 begins by generating derivative values from the video component data within the local processing window at step 1002. The derivative circuit 401 generates eight differential values between consecutive pixels from nine pixels {P1, P2, P3, P4, P0, P5, P6, P7, P8} in the one-dimensional, 9×1 processing window, constituting first derivative or dy/dx values, where y is the magnitude of the video component pixel value and x corresponds to the temporal or spatial pixel position in the processing window. In digital processing, the first derivatives can be represented by interpixel differences, where x corresponds to a unit pixel distance.

At step 1004, turning points are identified that meet certain noise criteria. This is achieved by providing the eight differential values to the six sign comparison circuits 402 operating in parallel, with each of the sign comparison circuits 402 processing an overlapping portion of the sequence of differential values. In the described embodiment, each of the sign comparison circuits 402 processes three sequential differential values. However, a greater number of values can be provided in alternative embodiments to achieve greater noise discrimination.

The first of the sign comparison circuits 402 uses the $1^{st}$, $2^{nd}$, and $3^{rd}$ differential values, the second of the sign comparison circuits 402 uses the $2^{nd}$, $3^{rd}$, and $4^{th}$ differential values, the third of the sign comparison circuits 402 uses the $3^{rd}$ to $5^{th}$ differential values, and so on. The sign comparison circuits 402 first identify potential turning points corresponding to zero derivative locations where dy/dx=0. In digital data, these turning points can be identified on the basis of changes in derivative signs, none of which are necessarily of zero value. The sign comparison circuits 402 first determine a sign value for each derivative value as a value from the set {0, −, +}, where 0 represents a derivative value of 0, − represents a negative derivative value and + represents a positive derivative value. The noise criteria are then used to select turning points using the signs of the eight derivative values. In the described embodiment, (i) a point is selected if either a change in sign is present and is at least three pixels wide i.e., the sign change is sustained for at least two adjacent pixels (e.g., +−−, ++−, −++, −−+, 0++, 00+, ++0, +00, 0−−, −−0, 00−, or −00, where +, −, and 0 represent positive, negative and zero first derivative values), or (ii) two points are selected if the sign change is only two pixels wide, but the absolute difference between the corresponding pixel values is greater than or equal to a predetermined threshold value KNOISE. By default, KNOISE is set to a value of 4, but higher threshold values can be used to reduce the sensitivity to small fluctuations and hence reduce the likelihood of noise enhancement.

For example, four consecutive pixel values {p1, p2, p3, p4} can be used to generate three first derivative values {d1, d2, d3} where d1=p2−p1, d2=p3−p2 and d3=p4−p3 with corresponding sign values {s1, s2, s3}. If the first criterion is met, for example the sign triplet is {0++}, then a turning point is identified as p2. If the sign triplet had been {++−}, then a turning point would be identified as p3. If the first criterion is not met, for example the sign triplets represents {+−+}, but the second criterion is met, for example the first derivative value d2 has a value of −10, which is greater in absolute magnitude than KNOISE, then two turning points are identified as p2 and p3.

After the turning points meeting the noise criteria have been selected at step 1004, their maximum or minimum characteristics are determined by identifying the conditions $d^2y/dx^2<0$ and $d^2y/dx^2>0$, respectively. This is achieved by comparing the changes in derivative signs at step 1006. Specifically, a maximum turning point is identified by any of the sign triplets {−−, +00, 0−−, ++−, 00−, ++0}, and a minimum turning point is identified by any of the sign triplets {−++, −00, 0++, −−+, 00+, −−0}. In the case of turning points meeting the second noise criterion, maximum and minimum turning points are identified respectively as two consecutive points by the occurrence of any one of the sign triplets {+−+, 0−0, 0−+, +−0} where the middle sign is negative. Similarly, minimum and maximum turning points are identified respectively as two consecutive points by any one of the sign triplets {−+−, 0+0, 0+−, −+0}, where the middle sign is positive.

For example, if the first criterion is met and the sign triplet is {−++}, then the turning point p2 is a minimum point; if the sign triplet is {++−}, then the turning point p3 is a maximum point. If the second criterion is met and the sign triplet is {+−+}, then turning point p2 is a maximum point and turning point p3 is a minimum point; if the sign triplet is {−+0}, then turning point p2 is a minimum point and turning point p3 is a maximum point.

A boundary of the local processing window is assigned a maximum or minimum point if the left derivative is negative or the right derivative is positive, respectively, and if the corresponding left or right derivative has a magnitude greater than KNOISE.

The logic combination circuit 403 performs a bitwise OR operation on the outputs of the sign comparison circuits 402 to generate three bit vectors of 9 bits each, representing turning points in the processing window and their maximum and minimum characteristics, respectively.

At step 1008, the bit-vector search circuit 404 uses the turning point bit vector to count the number of turning points within the processing window. In the event that there is only one turning point or there are more than a predetermined number KMAXTP turning points, where KMAXTP-1 represents the maximum number of edges or the maximum frequency of edges in the processing window, then the four values MAX_Y, MAX_POS, MIN_Y and MIN_POS are set to the center pixel value and position value as appropriate at step 1010 and the edge identification process 902 ends. A suitable value for KMAXTP is 7 for a processing window of 9×1 pixels.

Otherwise, the bit-vector search circuit 404 uses the maximum, minimum and turning point bit vectors to identify at step 1012 the two turning points nearest to the center pixel and that are on opposite sides of the center pixel, defining a region encompassing the center pixel. If the bit-vector search circuit 404 determines at step 1014 that the two turning points are either two maximum points or two minimum points, they are considered to be noise disturbances and the values MAX_Y, MAX_POS, MIN_Y and MIN_POS are set to the center pixel value and position value as appropriate at step 1010 and the edge identification process ends. The ultimate effect of this is that no edge improvement is performed, so that noise is not enhanced. Otherwise, the two turning points correspond to a maximum point and a minimum point, an edge has been found, and at step 1016 the outputs MAX_Y, MAX_POS, MIN_Y and MIN_POS and set to the respective maximum luminance Y pixel value and its position and the minimum luminance Y pixel value and its position. This ends the edge identification process 902.

In contrast to the horizontal max-min search circuit 304 described above, the vertical max-min search circuit 305 uses a smaller processing window with dimensions of 1×3 pixels. Because the window size is so limited, the processing is simpler and prior art maximum and minimum circuits such as those described in U.S. Pat. No. 6,094,205 can be used if desired. In general, there will either be (i) edge enhancement if the center pixel is the median value in the set comprising the top, center and bottom pixel, or (ii) no enhancement if all three pixels values are equal or the center pixel has a minimum or maximum value.

Returning to FIG. 9, at step 904 the horizontal selective edge control circuit 306 determines the edge properties for the edge identified by the edge identification process 902. Specifically, the edge width, height and slope are generated from the values of MAX_Y, MAX_POS, MIN_Y and MIN_POS as follows:

width=absolute (MAX_POS−MIN_POS)

height=MAX_Y−MIN_Y slope=height/width

The horizontal selective edge control circuit 306 uses these edge properties to select mid-strength edges for full enhancement, and to constrain extreme soft or hard edges to partial or no enhancement so that the picture quality is improved without introducing artifacts caused by over-enhancement.

Figure 5:
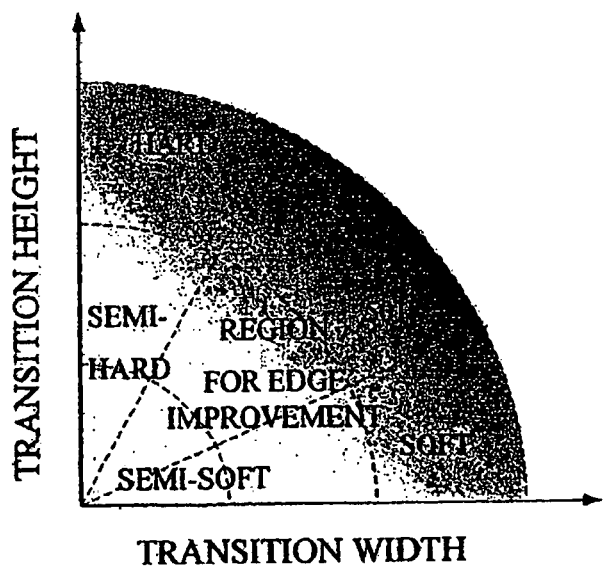
FIG. 5 is a schematic diagram illustrating the relationship between edge type and the transition width and height of an edge.

The dependence of edge strength on edge width and height is illustrated in FIG. 5. At low values of transition height, soft edges become semi-soft with decreasing transition width. At a low value of transition width, a semi-hard edge becomes hard with increasing transition height. The region 501 represents the preferred region for edge improvement, with the edges not being at either soft or hard extremes.

Figure 6A:
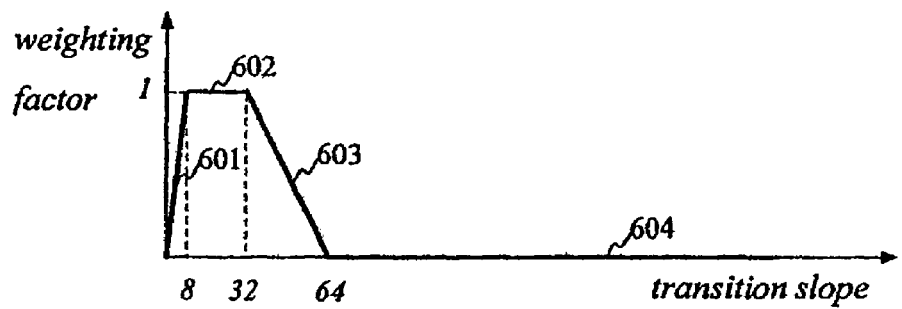
FIG. 6A is a schematic diagram illustrating the relationship between a transition slope weighting factor and the transition slope of an edge, used in a horizontal selective edge control circuit of the transient improvement circuit.
Figure 6B:
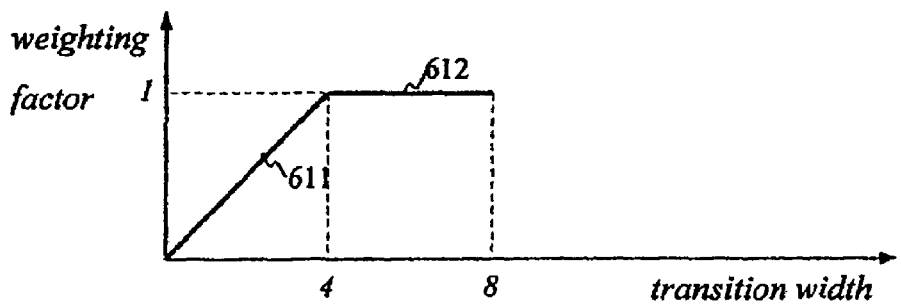
FIG. 6B is a schematic diagram illustrating the relationship between a transition width weighting factor and the transition width of an edge, used in the horizontal selective edge control circuit.
Figure 6C:
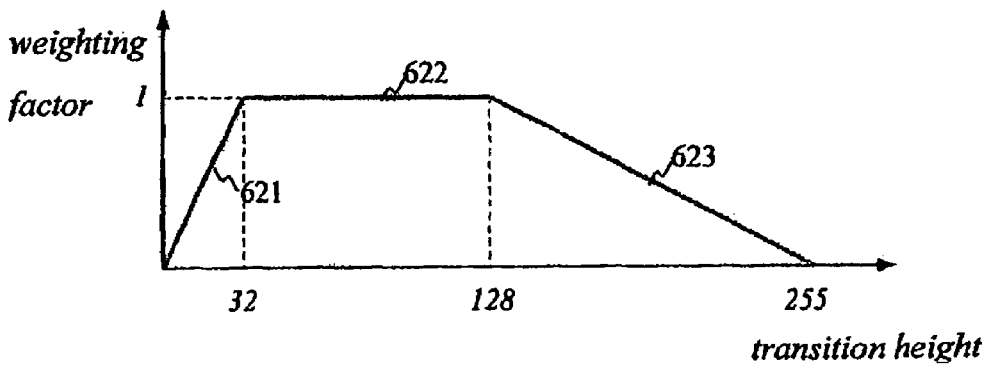
FIG. 6C is a schematic diagram illustrating the relationship between a transition height weighting factor and the transition height of an edge, used in the horizontal selective edge control circuit.

At step 906, the horizontal selective edge control circuit 306 generates weighting factors ranging from 0.0 to 1.0, with the limiting values corresponding to null and full enhancement for the edge, respectively. The weighting factors are generated from the three edge properties described above and respective predetermined relationships between each edge property and a corresponding weighting factor, as shown in FIGS. 6A to 6C. It will be apparent that any one or more of the three edge properties and weighting factors can be alternatively used if desired. By applying one or more of the weighting factors, over-enhancement of soft and hard edges is alleviated.

The predetermined relationship between transition slope and a transition slope weighting factor is shown in FIG. 6A. For convenience, edge property thresholds are chosen to be powers of 2, and linear variations of weighting factor values are preferred to ensure continuity in edges. Below a lower slope threshold value of 8, the transition slope weighting factor decreases linearly to zero as the transition slope decreases to zero in the soft edge region (segment 601). Between slope values of 8 and 32 (segment 602), the transition slope weighting factor has a constant maximum value of 1.0. Between slope threshold values of 32 and 64, the weighting factor decreases linearly from 1.0 to 0.0 with increasing slope (segment 603), and is 0.0 for slope values greater than 64, corresponding to the hard edge region (segment 604). This relationship defines a maximum edge slope beyond which an edge is not enhanced.

The relationship between transition width and transition width weighting factor is shown in FIG. 6B. In the described embodiment, the transition width is limited by the processing window used by the horizontal max-min search circuit 304. Above a moderate transition width of 4, the weighting factor has the maximum value of 1.0 (segment 612), below which, the weighting factor decreases linearly to 0.0 as the transition width decreases to 0 (segment 611).

The relationship between transition height and transition height weighting factor is shown in FIG. 6C. Between height values of 32 and 128, the weighting factor has a maximum value of 1.0 (segment 622). The weighting factor decreases linearly to zero as the height with decreases to 0 (segment 621) or increases to 255 (Segment 623).

At step 908, the horizontal selective edge control circuit 306 generates an enhancement weighting factor as the product of the transition slope weighting factor, the transition width weighting factor, and the transition height weighting factor. By multiplying these weighting factors and the enhancement signal generated by the edge enhancement circuit 311, as described below, selective edge control is achieved such that soft and hard edges are enhanced partially or not at all, whereas mid-strength edges are enhanced fully. Returning to FIG. 5, the area 501 is assigned a full weighting factor of 1.0 whereas areas outside 501 are de-emphasized by the non-linearly declining enhancement weighting factor, resulting from multiplying the linear edge weighting factors.

The vertical selective edge control circuit 307 is a simpler version of the horizontal selective edge control circuit 306. With only three video lines available, the maximum transition width achievable for any enhancement is 2 and consequently transition height is the only edge property used to generate a weighting factor. The relationship between transition height and the vertical transition height weighting factor used by the vertical selective edge control circuit 307 is shown in FIG. 6D. Between transition height values of 16 and 64 (segment 632), the weighting factor has a maximum value of 1.0. Below 16, the weighting factor decreases linearly to 0.0 as the height decreases to 0 (segment 631). Above 64, the weighting factor decreases linearly to 0.0 as the height increases to 128 (segment 633), and is maintained at 0.0 for higher values (segment 634). Similar to the horizontal selective edge control circuit 306, the vertical height weighting factor is multiplied by the vertical enhancement signal generated by the vertical edge enhancement circuit 312 to provide edge-constrained differential enhancement pixel luminance data YEV.

At step 910, the edge direction detection circuit 308 attempts to determine the direction or orientation of the edge based on minimum inter-pixel correlation. Alternatively, prior art edge direction detection circuits based on other methods can be used if desired. The edge direction detection circuit 308 uses a 9×3 processing window, represented in FIG. 7A. A set of detectable edge directions can be represented by a set of straight lines, with each line formed by joining three pixels including the center pixel, a pixel from the top line and a pixel from the bottom line. FIG. 7B shows the resulting set of ten directions, D0 to D9, for the processing window, including the horizontal direction D9.

A correlation value for each direction represented by three pixels is defined as the sum of the absolute inter-pixel differences or the sum of the absolute difference between the center pixel and the top pixel and the absolute difference between the center pixel and the bottom pixel. For example, the correlation value for direction D2 is given by abs(T4−P0)+abs(B6−P0). The detected direction, $D_i$, is the direction with the minimum correlation or inter-pixel differences below a predetermined threshold correlation value KMIN_CORRELATION with a default value of 16.

The process of direction detection can be represented by the equation:

$$D_i = \min\{\min\{correlation_j; j=9,0\}, KMIN\_CORRELATION\};$$

where $D_i$ is the detected direction and j takes the range of directions illustrated in FIG. 7B. The order of search for minimum correlation influences the detected direction, because if a correlation value generated for a new direction has the same value as a previously generated correlation value for a previously considered direction, the previously considered direction is considered to have the minimum value. The search therefore starts from the horizontal direction D9 and ends on the vertical direction D0 as indicated by the index of the above equation, because edges closer to the horizontal are more prone to aliasing.

It will be apparent that the edge direction detector 308 detects only a limited set of directions and in particular does not detect edges that are very close to the horizontal. These edges have the worst aliasing effects and are only detectable using the same methodology with an essentially infinite window width. The edge direction detector 308 outputs a null value indicating no specific direction when the minimum correlation of the covered directions is greater than or equal to the predetermined threshold value KMIN_CORRELATION, indicating there is uncertainty as to the presence of an edge. In this situation the possibilities are that either there is no edge or that the current pixel is residing on an edge very close to the horizontal or vertical and is not detectable by the edge direction detector 308. Consequently, if, at step 911, the edge direction output by the edge direction detector 308 is either null or the horizontal edge direction D9, then a corner test is performed at step 912 in order to allow corners to be excluded from being erroneously considered as edges close to the horizontal and used in aliasing reduction, as described below.

The corner test determines the uniformity of neighboring pixels in the lines above and below the current pixel as follows:

$$\text{corner test} = \begin{cases} 0, & \text{if } \begin{array}{c}(\text{abs}(T6-T5)+\text{abs}(T5-T4)) < KCORNER \\ \text{AND} \\ (\text{abs}(B6-B5)+\text{abs}(B5-B4)) < KCORNER\end{array} \\ 1, & \text{otherwise.} \end{cases}$$

The corner test thus outputs a false or zero result indicating that no corner is detected if the sum of (i) the absolute interpixel difference between the top right pixel T6 and the top center pixel T5 and (ii) the absolute interpixel difference between the top left pixel T5 and the top center pixel T4 is less than a pre-determined threshold value KCORNER, and the sum of (iii) the absolute interpixel difference between the bottom right pixel B6 and the bottom center pixel B5 and (iv) the absolute interpixel difference between the bottom left pixel B4 and the bottom center pixel B5 is also less than KCORNER. Otherwise, the corner test returns a positive result of 1, indicating that a corner may be present. The larger the value of KCORNER, the more corners are likely to be included as candidates for aliasing correction; the smaller the value of KCORNER, the more edges with wide transitions are excluded. The default value of KCORNER is 32.

Because the probability of aliasing increases as the angle of the edge makes to the horizontal decreases and the transition width decreases, the aliasing protection circuit 310 selects diagonal edges close to the horizontal for aliasing correction using the detected edge direction and then linearly scales the amount of edge enhancement based on a measurement of vertical aliasing for the current pixel. Consequently, aliasing artifacts resulting from edge enhancement are subjectively reduced or eliminated. However, it will be apparent that other anti-aliasing techniques may alternatively be used to determine the weighting factor for edge enhancement.

At step 913, a test is performed to determine whether a corner was detected at step 912. If a corner was not detected, then the amount of aliasing is determined at step 915 by determining the vertical differential on the current pixel. This step is also performed if the edge is a diagonal edge close to the horizontal (step 914); for example, if the edge makes an angle of more than 45 degrees to the vertical, or if the detected edge direction is one of the directions {D3, D4, D5, D6, D7, D8}. The amount of aliasing is determined at step 915 as the sum of the absolute interpixel difference between the top pixel T5 and the center pixel P0 and the absolute interpixel difference between the bottom pixel B5 and the center pixel P0.

Figure 8:
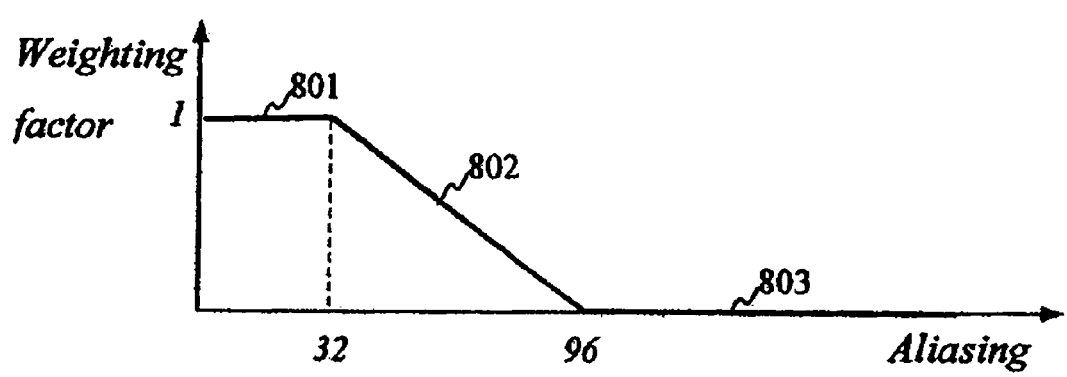
FIG. 8 is a schematic diagram illustrating the relationship between an aliasing weighting factor and a measured amount of aliasing, as used in an aliasing protection circuit of the transient improvement circuit.

Similar to the selective edge control circuit 306, at step 916 the aliasing protection circuit 310 generates an aliasing weighting factor based on the amount of aliasing determined above and a predetermined relationship between the amount of aliasing and the aliasing weighting factor. As shown in FIG. 8, there is full enhancement when the aliasing weighting factor has a maximum value of 1.0, corresponding to amounts of aliasing below a threshold value of 32 (segment 801), above which, the aliasing weighting factor decreases linearly to zero as the amount of aliasing increases to 96 (segment 802). Beyond this value, no enhancement is allowed and the aliasing weighting factor is 0.0 (segment 803). By multiplying the aliasing weighting factor generated by the aliasing protection circuit 310 and the enhancement signals from the edge enhancement circuit 311, aliasing protection is achieved such that saw tooth diagonal edges are not highlighted when an image is enhanced.

The edge-directed pre-filtering circuit 309 performs filtering along the detected edge direction prior to edge enhancement, ensuring uniformity along the edge and thereby reducing the difference in enhancement along the edge, thereby alleviating the jagged edges that may otherwise result from enhancing fuzzy edges fuzziness while maintaining the edge slope. In alternative embodiments, edge-directed pre-filtering is applied only when at least 3 lines of video data are provided as input.

Using the edge direction information from the edge direction detector circuit 308, at step 918 the edge-directed pre-filtering circuit 309 performs filtering if the detected edge is one of a subset of detected edges close to the vertical direction. Edges making an angle of less than or equal to 67.5 degrees from the vertical in a processing field, or directions represented by {D0, D1, D2, D3, D4} are selected as being close to the vertical. At step 920, the edge-directed pre-filtering circuit 309 performs low pass filtering on pixels along the edge. A 3-tap filter with coefficients [1 2 1]/4 is used for this purpose. For example, referring to FIGS. 3 and 7A, if the detected direction is D1, then the filtered output (T6+2*P0+B4)14 is used as input to the edge enhancer circuit 311 to determine the enhancement difference signal. If the detected edge direction is one of D4 to D9, no filtering is done.

At step 922, the edge enhancer circuit generates a differential enhancement signal. The edge enhancer circuits 311 and 312 can be provided by any suitable prior art edge enhancer circuits including but not limited to enhancement circuits based on a peaking filter, distances from a located edge center, the magnitude of the current pixel relative to the maximum and minimum pixel values or fading with current pixel to produce an enhancement signal. For example, a circuit based on a finite impulse response interpolation filter and using a sub-pixel edge center can be used to determine an enhanced signal, as described in International Patent Application Publication No. WO 01/67392. Alternatively, a circuit adjusting the intensity of slope can be used, as described in U.S. patent application Ser. No. 09/903,028, which is incorporated herein by reference in its entirety. The input to these circuits may be the original video signal or a filtered signal generated by the edge-directed pre-filtering circuit 309 together with edge information from the max-min search circuits 304 or 305. At step 924, the resulting output edge enhancement signal is scaled by the weighting factor from the selective edge control circuit 306 or 307, and the aliasing weighting factor from the aliasing protection circuit 310 to generate the desired scaled horizontal enhanced luminance pixel difference data YEH that is combined with the scaled vertical enhanced luminance pixel difference data YEV and the original input pixel luminance data to provide the output enhanced luminance pixel data YEN. This completes the edge enhancement process.

Many modifications will be apparent to those skilled in the art without departing from the scope of the present invention as herein described with reference to the accompanying drawings.

All of the above U.S. patents, U.S. patent application publications, U.S. patent applications, foreign patents, foreign patent applications and non-patent publications referred to in this specification and/or listed in the Application Data Sheet are incorporated herein by reference, in their entireties.

The invention claimed is:

1. An edge enhancement process, including:
   determining one or more properties of an edge of image data;
   generating one or more weighting factors on the basis of said one or more properties of said edge;
   processing said image data to determine an orientation of said edge;

filtering said image data along said orientation if said orientation is more vertical than horizontal; and scaling an edge enhancement signal by said one or more weighting factors to control the degree of edge enhancement.

2. An edge enhancement process as claimed in claim 1 wherein said one or more properties include one or more of edge width, edge height, edge slope, and amount of aliasing.

3. An edge enhancement process as claimed in claim 2 wherein said one or more weighting factors are generated on the basis of respective predetermined relationships between said one or more weighting factors and said one or more properties.

4. An edge enhancement process as claimed in claim 1 wherein said orientation is selected from a set of predetermined orientations.

5. An edge enhancement process as claimed in claim 1, including determining whether a corner is present in said image data if said orientation is not determined or if said orientation is horizontal.

6. An edge enhancement process as claimed in claim 5, including determining an amount of aliasing for said edge if a corner is not present or if said orientation is not horizontal but is more horizontal than vertical.

7. An edge enhancement process as claimed in claim 1 wherein said scaling includes multiplying said one or more weighting factors and said edge enhancement signal.

8. An edge enhancement process as claimed in claim 1, including:
identifying maximum and minimum turning points from said image data; and
selecting, from the identified maximum and minimum turning points, a maximum turning point and a minimum turning point that are located on opposing sides of, and closest to, a center location of said image data to provide values and locations of maximum and minimum pixels of said edge.

9. An edge enhancement process as claimed in claim 8, including:
generating first derivative values from said image data;
identifying, on the basis of said first derivative values, turning points that meet at least one predetermined noise criterion; and
wherein said maximum and minimum turning points are selected from the identified turning points.

10. An edge enhancement process as claimed in claim 1 wherein horizontal and vertical weighting factors are generated on the basis of properties of horizontal and vertical edges of said image data; and said scaling includes scaling horizontal and vertical edge enhancement signals by said horizontal and vertical weighting factors.

11. An edge enhancement system, comprising:
means for determining one or more properties of an edge of image data;
means for generating one or more weighting factors on the basis of said one or more properties of said edge;
means for processing said image data to determine an orientation of said edge;
means for filtering said image data along said orientation if said orientation is more vertical than horizontal; and
means for scaling an edge enhancement signal by said one or more weighting factors to control the degree of edge enhancement.

12. An edge enhancement system as claimed in claim 11, including means for determining whether a corner is present in said image data if said orientation is not determined or if said orientation is horizontal.

13. A computer readable storage medium having stored thereon program code for causing a processor to execute a method comprising:
determining one or more properties of an edge of image data;
generating one or more weighting factors on the basis of said one or more properties of said edge;
processing said image data to determine an orientation of said edge;
filtering said image data along said orientation if said orientation is more vertical than horizontal; and
scaling an edge enhancement signal by said one or more weighting factors to control the degree of edge enhancement.

14. A computer readable storage medium as claimed in claim 13, wherein the method includes determining whether a corner is present in said image data if said orientation is not determined or if said orientation is horizontal.

15. An edge enhancement system, including:
a selective edge controller for determining one or more properties of an edge of image data, and for generating one or more weighting factors on the basis of said one or more properties of said edge;
a scaling component for scaling an edge enhancement signal by said one or more weighting factors to control the degree of edge enhancement;
an aliasing protector for determining an amount of aliasing for said edge and for generating an aliasing weighting factor on the basis of said amount of aliasing to scale said edge enhancement signal.

16. An edge enhancement system as claimed in claim 15 wherein said scaling component multiplies said edge enhancement signal and said one or more weighting factors.

17. An edge enhancement system as claimed in claim 15 wherein said edge is a horizontal edge, and the system further includes:
a selective vertical edge controller for generating one or more vertical weighting factors on the basis of said one or more properties of a vertical edge in said image data; and
a vertical scaling module for scaling a vertical edge enhancement signal by said one or more vertical weighting factors.

18. An edge enhancement system as claimed in claim 17, including an adder for adding together the scaled edge enhancement signal for said horizontal edge, the scaled vertical edge enhancement signal, and corresponding input image data, to generate edge enhanced image data.

19. An edge enhancement system as claimed in claim 15, including an edge orientation detector for determining an orientation of said edge.

20. An edge enhancement system as claimed in claim 19, including an edge filter for filtering said image data along said orientation if said orientation is substantially vertical.

21. An edge enhancement system as claimed in claim 15, including an edge detector for determining a maximum turning point and a minimum turning point that are closest to a center location of said image data and that are located on opposing sides of said center location, to determine values and locations of maximum and minimum pixels of said edge.

22. An edge enhancement system as claimed in claim 21 wherein said edge detector includes a first derivative module for generating first derivative values from said image data, sign comparators for determining signs of said first derivative values, a logic combiner for generating maximum and minimum turning point values from said signs, said maximum and minimum turning point values meeting at least one predetermined noise criterion, and a search component for determining said values and locations of said edge from said maximum and minimum turning point values.

23. An edge enhancement system as claimed in claim 15, including an edge enhancer for generating said edge enhancement signal.

24. A display processor, including:
   a video input for receiving an input image; and
   an edge enhancement system that includes:
      a selective edge controller for determining one or more properties of an edge of image data, and for generating one or more weighting factors on the basis of said one or more properties of said edge;
      a scaling component for scaling an edge enhancement signal by said one or more weighting factors to control the degree of edge enhancement; and
      an aliasing protector for determining an amount of aliasing for said edge and for generating an aliasing weighting factor on the basis of said amount of aliasing to scale said edge enhancement signal.

25. A display processor as claimed in claim 24, wherein the edge enhancement system includes:
   an edger detector for determining a maximum turning point and minimum turning point that are closest to a center location of said image data and that are located on opposing sides of said center location, to determine values and locations of maximum and minimum pixels of said edge, when said edge detector includes a first derivative module, for generating first derivative values from said image data, sign comparators for determining signs of said first derivative values, a logic combiner for generating maximum and minimum turning point values from said signs, said maximum and minimum turning points values meeting at least one predetermined noise criterion, and a search component for determining said values and locaions of said edge from said maximum and minimum turning points values.

26. A television receiver, including:
   a television input for receiving a TV image signal; and
   an edge enhancement system that includes:
      a selective edge controller for determining one or more properties of an edge of image data, and for generating one or more weighting factors on the basis of said one or more properties of said edge;
      a scaling component for scaling an edge enhancement signal by said one or more weighting factors to control the degree of edge enhancement;
      an edge orientation detector for determining an orientation of said edge; and
      an edge filter for filtering said image data along said orientation if said orientation is substantially vertical.

27. A television receiver as claimed in claim 26, wherein the edge enhancement system includes:
   an edge detector for determining a maximum turning point and a minimum turning point that are closest to a center location of said image data and that are located on opposing sides of said center location, to determine values and locations of maximum and minimum pixels of said edge, wherein said edge detector includes a first derivative module for generating first derivative values from said image data, sign comparators for determining signs of said first derivative values, a logic combiner for generating maximum and minimum turning point values from said signs, said maximum and minimum turning point values meeting at least one predetermined noise criterion, and a search component for determining said values and locations of said edge from said maximum and minimum turning point values.

28. An edge enhancement process, comprising:
   determining one or more properties of an edge of image data;
   generating one or more weighting factors based on the one or more properties of the edge;
   determining if the edge is a substantially vertical edge or a substantially horizontal edge;
   producing an edge enhancement signal that is weighted by the one or more weighting factors;
   scaling the edge enhancement signal by an additional weighting factor in response to determining that the edge is a substantially horizontal edge; and
   using the edge enhancement signal to enhance the edge.

29. The process of claim 28 wherein the one or more properties include one or more of edge width, edge height, edge slope, and amount of aliasing.

30. The process of claim 28 wherein the one or more weighting factors are generated based on respective predetermined relationships between the one or more weighting factors and the one or more properties.

31. The process of claim 28, further comprising filtering the image data along the edge in response to determining that the edge is more vertical than horizontal.

32. The process of claim 28 further comprising determining whether a corner is present in the image data in response to determining that the edge is substantially horizontal.

33. The process of claim 32 further comprising determining an amount of aliasing for the edge if the corner is not present or if the edge is more horizontal than vertical.

34. The process of claim 28 wherein the producing step includes generating an initial edge enhancement signal and scaling the initial edge enhancement signal to produce the edge enhancement signal.

35. The process of claim 28, further comprising:
   identifying maximum and minimum turning points from the image data; and
   selecting, from the identified maximum and minimum turning points, a maximum turning point and a minimum turning point that are located om opposing sides of, and closest to, a center location of the image data to provide values and locations of maximum and minimum pixels of the edge.

36. The process of claim 35, further comprising:
   generating first derivative values from the image data;
   identifying, on the basis of the first derivative values, turning points that meet at least one predetermined noise criterion; and
   wherein the maximum and minimum turning points are selected from the identified turning points.

37. An edge enhancement process, including:
   determining one or more properties of an edge of image data;
   generating one or more weighting factors on the basis of said one or more properties of said edge;
   processing said image data to determine an orientation of said edge;
   determining whether a corner is present in said image data if said orientation is not determined or if said orientation is horizontal; and
   scaling an edge enhancement signal by said one or more weighting factors to control the degree of edge enhancement.

38. An edge enhancement process as claimed in claim 37, including determining an amount of aliasing for said edge if a corner is not present or if said orientation is not horizontal but is more horizontal than vertical.

39. An edge enhancement process as claimed in claim 37 wherein said one or more properties include one or more of edge width, edge height, edge slope, and amount of aliasing.

40. An edge enhancement process, including:
generating first derivative values from image data;
identifying, based on said first derivative values, turning points that meet at least one predetermined noise criterion;
identifying maximum and minimum turning points from said turning points; and
selecting, from the identified maximum and minimum turning points, a maximum turning point and a minimum turning point that are located on opposing sides of, and closest to, a center location of said image data to provide values and locations of maximum and minimum pixels of an edge;
determining one or more properties of the edge of said image data;
generating one or more weighting factors on the basis of said one or more properties of said edge; and
scaling an edge enhancement signal by said one or more weighting factors to control the degree of edge enhancement.

41. An edge enhancement process as claimed in claim 40, including:
processing said image data to determine an orientation of said edge; and
determining whether a corner is present in said image data if said orientation is not determined or if said orientation is horizontal.

42. An edge enhancement system, including:
a selective edge controller for determining one or more properties of an edge of image data, and for generating one or more weighting factors on the basis of said one or more properties of said edge;
a scaling component for scaling an edge enhancement signal by said one or more weighting factors to control the degree of edge enhancement;
an edge orientation detector for determining an orientation of said edge; and
an edge filter for filtering said image data along said orientation if said orientation is substantially vertical.

43. An edge enhancement system as claimed in claim 42, including:
an edge detector for determining a maximum turning point and a minimum turning point that are closest to a center location of said image data and that are located on opposing sides of said center location, to determine values and locations of maximum and minimum pixels of said edge, wherein said edge detector includes a first derivative module for generating first derivative values from said image data, sign comparators for determining signs of said first derivative values, a logic combiner for generating maximum and minimum turning point values from said signs, said maximum and minimum turning point values meeting at least one predetermined noise criterion, and a search component for determining said values and locations of said edge from said maximum and minimum turning point values.

44. An edge enhancement system as claimed in claim 42, including:
an edge detector for determining a maximum turning point and a minimum turning point that are closest to a center location of said image data and that are located on opposing sides of said center location, to determine values and locations of maximum and minimum pixels of said edge, wherein said edge detector includes a first derivative module for generating first derivative values from said image data, sign comparators for determining signs of said first derivative values, a logic combiner for generating maximum and minimum turning point values from said signs, said maximum and minimum turning point values meeting at least one predetermined noise criterion, and a search component for determining said values and locations of said edge from said maximum and minimum turning point values.
a selective edge controller for determining one or more properties of an edge of image data, and for generating one or more weighting factors on the basis of said one or more properties of said edge; and
a scaling component for scaling an edge enhancement signal by said one or more weighting factors to control the degree of edge enhancement.

45. An edge enhancement system as claimed in claim 44 wherein said edge is a horizontal edge, and the system further includes:
a selective vertical edge controller for generating one or more vertical weighting factors on the basis of said one or more properties of a vertical edge in said image data; and
a vertical scaling module for scaling a vertical edge enhancement signal by said one or more vertical weighting factors.

* * * * *

UNITED STATES PATENT AND TRADEMARK OFFICE
CERTIFICATE OF CORRECTION

PATENT NO.       : 7,406,208 B2
APPLICATION NO.  : 10/847206
DATED            : July 29, 2008
INVENTOR(S)      : Patricia Wei Yin Chiang It is certified that error appears in the above-identified patent and that said Letters Patent is hereby corrected as shown below:

Column 16
Line 26, "degree of edge enhancement;" should read as -- degree of edge enhancement; and --

Column 17
Line 23, "an edger detector for determining a maximum turning" should read as -- an edge detector for determining a maximum turning --

Column 17
Lines 33 through 38, "said maximum and minimum turning points values meeting at least one predetermined noise criterion, and a search component for determining said values and locaions of said edge from said maximum and minimum turning points values." should read as -- said maximum and minimum turning point values meeting at least one predetermined noise criterion, and a search component for determining said values and locations of said edge from said maximum and minimum turning point values. --

Column 18
Line 43, "turning point that are located om opposing sides of" should read as -- turning point that are located on opposing sides of --

Column 20
Lines 14 through 15, "An edge enhancement system as claimed in claim 42, including:" should read as -- An edge enhancement system, including: --

UNITED STATES PATENT AND TRADEMARK OFFICE
CERTIFICATE OF CORRECTION

PATENT NO. : 7,406,208 B2
APPLICATION NO. : 10/847206
DATED : July 29, 2008
INVENTOR(S) : Patricia Wei Yin Chiang It is certified that error appears in the above-identified patent and that said Letters Patent is hereby corrected as shown below:

Column 20
Line 30, "and minimum turning point values." should read as -- and minimum turning point values; --

Signed and Sealed this

Thirtieth Day of September, 2008

JON W. DUDAS
*Director of the United States Patent and Trademark Office*